Patented Mar. 1, 1949

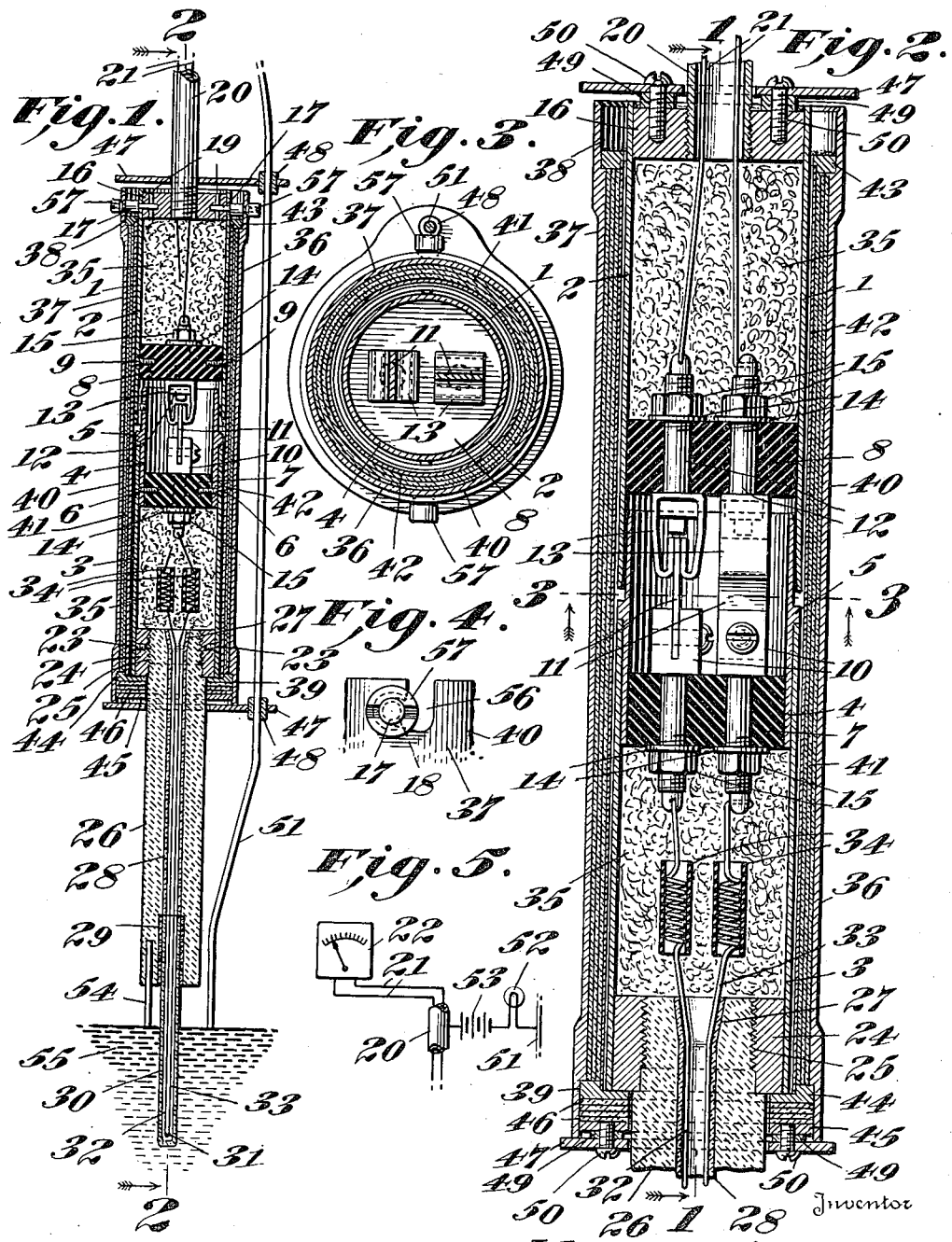

2,463,427

UNITED STATES PATENT OFFICE 2,463,427

IMMERSION THERMOCOUPLE

Ward F. Richards, Bethlehem, Pa., assignor to Bethlehem Steel Company, a corporation of Pennsylvania Application February 7, 1946, Serial No. 646,058

7 Claims. (Cl. 73—359)

1

My invention relates to a temperature-measuring device, and more particularly to a thermoelectric device adapted for use in the measurement of temperatures in baths of molten metal.

The measuring of molten steel temperatures while the metal is still in the furance or is being cast has long been a serious problem. One device which has been used is the so-called blowpipe, which consists of a heavy tube wherein a constant air pressure is maintained while one end is inserted through the slag into the metal. In the other end of the tube is attached an E. M. F. generating photocell which views the metal in the furnace and generates a voltage proportional to the intensity or color temperature of the bath. This light is actually quite feeble and consequently the voltage generated requires ultra-sensitive apparatus for its measurement. Certain other electrical difficulties are also inherent in this type of device, so that in practical operation it has not been generally accepted.

Direct immersion types of thermocouples are thus plainly to be preferred, but there then appears the difficulty that the use of bare metal couples must be restricted to temperatures well below their melting points, or under 1500° C. (2732° F.) for platinum/platinum-iridium couples. The proper temperature for tapping steel from an open-hearth furnace, however, is in the neighborhood of 1480° C. (2700° F.) to 1612° C. (2930° F.), so that the necessity of means for protecting the delicate and expensive wires of the thermocouple without interfering with the thermal response becomes apparent. Also, the complete assembly should be sufficiently light in weight to be easily handled, and it should be constructed simply enough to permit ready adjustment or repair by the operator.

One object of this invention, therefore, is to provide a protected thermocouple device adapted for use in measuring temperatures of molten metal.

Another object is a thermocouple device which is light enough in weight to be manipulated without effort by one man.

Another object is a thermocouple device which can be easily taken apart and adjusted without requiring return to shop.

Another object is a device which is flexible and durable and can be used either as a straight assembly or at an angle.

A further object is an indicator to show depth of immersion in the bath.

Still other objects, purposes and advantages of the invention will appear hereinafter in the specification and in the appended claims.

In order to have my invention more readily understood, I shall now refer to the sheet of drawings hereto annexed, in which like characters of reference designate like parts:

Figure 1 is a vertical transverse section of

2 my invention taken on the line 1—1 of Fig. 2 and showing the immersion in the bath of the thermocouple tip;

Fig. 2 is an enlarged partial section taken on the line 2—2 of Fig. 1;

Fig. 3 is a horizontal transverse section taken on the line 3—3 of Fig. 2;

Fig. 4 is a detail view of the bayonet slot lock; and

Fig. 5 is a wiring diagram of the temperature and depth indicating means.

Referring now to the drawings, my complete device comprises two major units, which may be designated as an outside assembly and an inside assembly. The inner assembly casing 1 comprises the two aligned short seamless metal tubes 2 and 3, preferably of steel, which are connected together by an inner steel sleeve or bushing 4 provided near its middle portion with an annular rib 5. One end of the sleeve 4, up to the rib 5, is securely attached within the lower tube 3 by two flat-head machine screws 6, the other end of said sleeve 4 being machined for a slip fit permitting the upper tube 2 to be pushed over it. Said screws 6 also hold in place a round fibre terminal block 7 within the lower tube 3, and a similar fibre block 8 is held in place in the upper tube 2 by the screws 9. On said block 7 are mounted two male terminal posts 10, having blade contacts 11, set at right angles to each other to prevent confusion of polarity; and two female terminal posts 12 having spring clip contacts 13 adapted to engage the blade contacts 11 which are similarly mounted on the block 8. Washers 14 and nuts 15 engage threaded ends of the terminal posts 10 and 12.

In the open end of the upper tube 2 is located a metal collar 16, secured in place by projecting pins 17 threaded on their outer ends 18 and drilled to admit transverse smaller pins 19. Said collar 16 is centrally tapped to accommodate an end-threaded pipe 20 serving as a handle. Copper lead wires 21 secured by brazing or the like to the terminal posts 12 run through said pipe 20 and complete the circuit to a standard highly responsive E. M. F. measuring device 22.

Similarly located in the open end of the lower tube 3 and secured thereto by the flat-head screws 23 is a heavier collar 24 tapped to accommodate the threaded upper end 25 of a thick-walled graphite tube 26. The central bore through the graphite tube 26 is flared at its upper extremity 27 to hold a correspondingly flared insulating quartz tube 28. The lower end of said graphite tube 26 is countersunk sufficiently to accommodate an asbestos tubing retainer 29 in which a relatively thin-walled closed quartz tube 30 for protecting the thermocouple junction 31 is removably held. The thermocouple proper may consist of a platinum wire 32 and another wire 33 of an alloy of platinum and 10%-13% of rhodium or iridium, welded at said junction 31. A surplus supply of each wire is coiled within small diameter fibre tubes 34, and the wires are then brazed to the terminal posts 10. The space between the end collar and terminal block in each of the tubes 2 and 3 is packed with shredded asbestos 35.

The outer assembly 36 comprises an outer metal tube casing 37, preferably steel, counterbored at 38 and 39 at each end and preferably machined on the outside surface 40 to reduce weight between the ends as shown. The inside surface of said tube casing 37 has a lining of sheet mica 41 held in place by an inner steel tube retainer 42 adapted to fit over the inner assembly casing 1. A metal collar 43 recessed to receive the upper edge of the retainer 42 is brazed within the upper counterbore 38 to the outer casing 37 and retainer 42, and a similar collar 44, recessed to receive the lower edges of the retainer 42 and the tube 3 and the collar 24, is brazed within the lower counterbore 39. A plain metal collar 45 spaced from said recessed collar 44 by mica washers 46 is brazed at the bottom of said outer casing 37, the central apertures of both the collars 44 and 45 and the washers 46 being adapted to permit ready passage of the graphite tube 26 therethrough.

Flat metal plate collars 47 having inserted porcelain bushings 48 are spaced by washers 49 and secured by bolts 50 threaded into tapped holes in the end collars 16 and 45. A wire 51 vertically adjustable in said porcelain bushings 48 is connected to a flashlight bulb 52 and small batteries 53 mounted on and connected to the pipe handle 20. In cooperation with a shorter wire 54 mounted in the graphite tube 26, contact of the wires with the hot metal bath 55 will complete the circuit and thus indicate proper immersion of the thermocouple. While this depth indicating feature is of general usefulness, it is positively required only where direct observation of the device is difficult or impossible.

The outside assembly 36, when slipped over the inside casing 1, is securely held in the bayonet slot locks 56, in which the pins 17 are secured by thumb-nuts 57 on the end threads 18. In cases where the temperatures are relatively low, or the periods of exposure can be kept extremely short, the outer assembly 36 may sometimes be dispensed with and a thin covering of asbestos twine or tubing with an outer coating or refractory cement (not shown) substituted as a protection against metal splash.

Temperatures up to 1760° C. (3200° F.) have been measured with a device of this kind, yet the entire inner and outer assembly together (excluding the pipe handle 20 which may vary in length or shape to accommodate any required condition) weighs only about four pounds. In the event of contamination or failure of the thermocouple during use, it can be replaced in emergencies by a spare lower unit in two or three minutes, without requiring any special skill on the part of the operator. The damaged thermocouple is then repaired by removing the quartz tube 30, pulling down some of the coiled wires 32 and 33, cutting off the impaired portions, welding and annealing a new junction 31, replacing the quartz tube 30, and finally recalibrating.

Although I have described my invention hereinabove in considerable detail, I do not wish to be limited to the exact and specific details disclosed, but I may also use such modifications, substitutions or equivalents thereof as are included within the scope and spirit of the invention, or pointed out in the appended claims.

In accordance with the foregoing, what I claim as new and useful and desire to protect by Letters Patent is:

1. A thermocouple for measuring temperatures of molten metal, comprising a thin-walled refractory sheath, a thermojunction adjacent the inner bottom portion in said sheath, a refractory body surrounding the upper outer portion of said sheath, separable means for connecting the thermojunction with external measuring instruments, a thermally insulated metallic casing for protecting said separable means, an external source of electric current, a pair of contactors terminating above the thermojunction, and current-indicating means connected between the current source and the contactors for indicating a continuous electrical circuit between the contactors upon their contact with the bath.

2. A thermocouple for measuring temperatures of molten metal, comprising relatively short upper and lower metal tubes, an inner sleeve separably connecting the tubes, a closure at the outer end of each tube, a pipe handle secured at the closure of the upper tube, a thick-walled tube of refractory material secured at the closure of the lower tube, a thin-walled tube of refractory material inserted in the bottom of the thick-walled tube, a thermocouple in said thin-walled tube, and lead wires and plug-in terminals mounted adjacent the sleeve in said upper and lower tubes for connecting the thermocouple with external temperature indicating means.

3. A thermocouple for measuring temperatures of molten metal, comprising a pair of metal tubes, a connecting sleeve attached to one tube and providing a slip fit for the other tube to be joined thereby, a metal collar at the outer end of each tube, a pipe handle threaded into one of said collars, a graphite tube threaded into the other collar, an insulating quartz tube within the upper part of the graphite tube, asbestos tubing within the lower part of the graphite tube, a quartz tube having its upper end inserted in the asbestos tubing and closed at the bottom end, fibre blocks mounted adjacent the collar in each tube, polarized plug-in terminals mounted on said blocks, thermocouple wires having their hot junction protected by the bottom quartz tube and passing through the insulating quartz tube to connect to one set of the plug-in terminals, and lead wires connected to the other set of plug-in terminals and passing through the pipe handle.

4. A thermocouple for measuring temperatures of molten metal, comprising a pair of aligned upper and lower metal tubes, an inner sleeve provided with an annular centering rib joining said pair of tubes, means for securing said sleeve to the lower tube, a terminal block mounted adjacent the sleeve in each tube, blade terminals mounted at right angles to each other on the terminal block in the lower tube, spring terminals mounted on the terminal block in the upper tube to engage the blade terminals, a tapped metal collar at the top end of the upper tube, projecting pins threaded on their outer ends securing said collar, a pipe handle threaded into the collar, lead wires run through said pipe handle connected to the spring terminals, a second tapped collar secured in the bottom end of the lower tube, a depending carbon tube threaded into said collar, an insulating silica tube in the upper part of the bore of the carbon tube, an asbestos tubing retainer in the lower part of the bore of the carbon tube, a silica tube sealed at the exposed bottom end and slidably inserted in said retainer, thermocouple wires having their junction within the silica tube and having their excess lengths wound in coils within the lower metal tube and connected to the blade terminals, insulating tubes protecting said coils, and shredded asbestos packed in both metal tubes.

5. A thermocouple for measuring temperatures of molten metal, comprising an inner assembly comprising a pair of mutually attachable metal tubes, a terminal block mounted in each tube adjacent the point of attachment, cooperating upper and lower terminals mounted on the terminal blocks, tapped metal closures at the upper and lower ends of the pair of tubes, a pipe handle threaded into the upper tapped closure, conductors passing through the pipe handle and connected to the upper terminals, a carbon tube threaded into the lower tapped closure, a silica tube sealed at its lower end and partially inserted in the carbon tube, thermocouple wires in said silica tube and connected to the lower terminals; and an outer assembly comprising a metal tube adapted to fit over the inner assembly, a sheet mica liner thereover, an outer metal tube over the mica liner, and bayonet slot locking means to secure said outer assembly onto the inner assembly.

6. The combination, with the device described in claim 3, of an outer assembly comprising a tubular metal outer casing having a counterbore at each end, a liner of heat insulating sheet material therein, an inner metal tube retainer adapted to fit over the said device and to hold the sheet liner in place, a metal collar recessed to receive the upper edge of said retainer and attached thereto and to the outer casing within its upper counterbore, a similar collar recessed to receive the lower end of the inner assembly and attached to the outer casing within its lower counterbore, heat insulating washers therebelow, and a metal collar adapted to permit the graphite tube to pass therethrough and attached to the bottom of the outer casing.

7. A thermocouple for measuring temperatures of molten metal, comprising a thermojunction, a hollow silica tip member enclosing the thermojunction and adapted to be partially immersed in the molten metal, graphite tubing surrounding the silica member but terminating short of the immersed extremity thereof, a metal tube casing secured to said graphite tubing, a handle secured to said casing, a current source one pole of which is connected to the handle, a current indicator one side of which is connected to the opposite pole of said current source, a conductor fixed in place on the graphite tubing, an insulating mounting on the metal tube casing, and a conductor vertically adjustable in said mounting to the desired level of immersion of the tip member and connected to the other side of the current indicator.

WARD F. RICHARDS.

REFERENCES CITED

The following references are of record in the file of this patent:

UNITED STATES PATENTS

| Number | Name | Date |
|---|---|---|
| 1,768,512 | De Leeuw | June 24, 1930 |
| 2,053,938 | Barker | Sept. 8, 1936 |
| 2,149,448 | Lederer et al. | Mar. 7, 1939 |
| 2,279,846 | Stapleton | Apr. 14, 1942 |

FOREIGN PATENTS

| Number | Country | Date |
|---|---|---|
| 299,935 | Germany | Jan. 23, 1916 |

OTHER REFERENCES

Weitzenkorn, L. F., Electric Furnace Steel, Proc. 2nd Conf. A. I. M. E. (1944), pp. 146–148.

Schofield et al., Eighth Report on the Heterogeneity of Steel Ingots (1939), pp. 242–244.